United States Patent
Raghavan et al.

[19]

[11] Patent Number: 6,056,665
[45] Date of Patent: May 2, 2000

[54] FIVE SPEED PLANETARY TRANSMISSION

[75] Inventors: Sekhar Raghavan; Kumaraswamy V. Hebbale; Patrick Benedict Usoro, all of Troy, Mich.

[73] Assignee: General Motors Corporation, Detroit, Mich.

[21] Appl. No.: 09/168,614

[22] Filed: Oct. 9, 1998

[51] Int. Cl.$^7$ ..................................................... F16H 3/62
[52] U.S. Cl. .......................... 475/280; 475/284; 475/290; 475/319; 475/325
[58] Field of Search .................... 475/269, 296, 475/319, 325, 280, 284, 290

[56] References Cited

U.S. PATENT DOCUMENTS

| | | | |
|---|---|---|---|
| 2,821,869 | 2/1958 | Kelbel | 475/280 X |
| 5,141,477 | 8/1992 | Oshidari | 475/330 |
| 5,194,055 | 3/1993 | Oshidari | 475/280 X |
| 5,567,201 | 10/1996 | Ross | 475/280 |
| 5,692,988 | 12/1997 | Beim et al. | 475/280 X |
| 5,816,972 | 10/1998 | Park | 475/284 |
| 5,823,910 | 10/1998 | Park | 475/284 X |
| 5,853,345 | 12/1998 | Park | 475/284 |

FOREIGN PATENT DOCUMENTS

| | | | |
|---|---|---|---|
| 61-130648 | 6/1986 | Japan | 475/280 |
| 62-9049 | 1/1987 | Japan | 475/284 |
| 3-92648 | 4/1991 | Japan | 475/280 |
| 3-92649 | 4/1991 | Japan | 475/284 |
| 3-92650 | 4/1991 | Japan | 475/284 |
| 3-282038 | 12/1991 | Japan | 475/284 |

*Primary Examiner*—Khoi Q. Ta
*Attorney, Agent, or Firm*—George A. Grove

[57] ABSTRACT

A five speed planetary transmission has a simple planetary gear set, a compound planetary gear set and six torque transmitting devices which are engaged in combinations of three to provide five forward ratios and one reverse ratio. The planetary gear sets are interconnected with a continuous drive connection and one of the torque transmitting devices. Two of the transmitting devices are input clutches and the other three are brakes. The planetary carrier assembly member of the simple planetary gear set is the only member connected with the output shaft during all of the ratios. The ratio interchanges in both single step and double step forward interchanges are of the single transition type.

5 Claims, 2 Drawing Sheets

| GEAR | 24 | 26 | 28 | 30 | 32 | 34 |
|---|---|---|---|---|---|---|
| REVERSE |  | X | X | G |  |  |
| NEUTRAL |  | O | O |  |  |  |
| FIRST |  | X | X |  | G |  |
| SECOND | X |  | X |  | X |  |
| THIRD | X | X | X |  |  |  |
| FOURTH | X |  | X |  |  | X |
| FIFTH | X | X |  |  |  | X |

|  | OPTION 1 | OPTION 2 | OPTION 3 |
|---|---|---|---|
| FIRST GEAR RATIO | 2.60 | 2.80 | 3.05 |
| SECOND | 1.58 | 1.60 | 1.65 |
| THIRD | 1.00 | 1.00 | 1.00 |
| FOURTH | 0.64 | 0.67 | 0.68 |
| FIFTH | 0.51 | 0.54 | 0.56 |
| REV | 1.78 | 2.00 | 2.16 |
| 1-2 STEP SIZE | 1.65 | 1.75 | 1.85 |
| 2-3 | 1.58 | 1.60 | 1.65 |
| 3-4 | 1.56 | 1.50 | 1.46 |
| 4-5 | 1.25 | 1.24 | 1.22 |
| GEAR SET NO. 22 R/S | 2.54 | 2.33 | 2.18 |
| GEAR SET NO. 20 R/S | 1.60 | 1.80 | 2.05 |

FIG. 3

FIVE SPEED PLANETARY TRANSMISSION

TECHNICAL FIELD

This invention relates to multi-speed planetary transmissions and, more particularly, to transmissions having a simple planetary gear set and a compound planetary gear set controlled by three clutches and three brakes to provide five forward drive ratios, a neutral condition and a reverse drive ratio.

BACKGROUND OF THE INVENTION

Automatic transmissions employ multi-speed planetary gear sets, controlled by friction clutches and brakes, to provide a plurality of gear ratios between the engine and final drive gearing. The number of ratios provided in passenger vehicles has increased from two forward ratios and one reverse ratio to five forward ratios and one reverse ratio. As the number of ratios increases, the number of planetary gear sets has increased.

Currently, the five speed transmissions available in passenger vehicles incorporate three planetary gear sets. It has been proposed in the art to use only two gear sets. Such devices are disclosed in pending U.S. Ser. Nos. 09/144,140 filed Aug. 31, 1998 and 09/179,756 filed Oct. 27, 1998 and in U.S. Pat. No. 5,879,264 which are assigned to the assignee of this application. Five speed arrangements incorporating two gear sets are also shown in U.S. Pat. Nos. 5,141,477; 5,567,201 and 5,692,988.

SUMMARY OF THE INVENTION

It is an object of the present invention to provide an improved multi-speed planetary transmission having two interconnected planetary gear sets, one of which is a simple planetary gear set having a carrier assembly member connected with an output shaft, and a plurality of selectively engageable torque-transmitting assemblies.

In one aspect of the present invention, the other planetary gear set is a compound planetary gear set having the sun gear member thereof continuously drivingly connected with the ring gear member of the simple planetary gear set. In another aspect of the present invention, the torque-transmitting assemblies comprise two input clutches connecting an input shaft with the planetary gear sets and an interconnecting clutch selectively connecting the simple planetary sun gear member with the compound planetary carrier assembly member.

In yet another aspect of the present invention, the torque-transmitting assemblies further comprise three selectively engageable brake members for providing reaction members in one or both of the planetary gear sets. In still another aspect of the present invention, one of the input clutches and the interconnecting clutch are engaged during the lowest forward drive ratio, the neutral condition and the reverse drive ratio.

In a further aspect of the present invention, one input clutch and the interconnecting clutch are engaged during at least four forward ratios, three of which have both clutches engaged. In a yet further aspect of the present invention, the other of the input clutches and the interconnecting clutch are engaged during the reverse ratio, at least three forward ratios and the neutral condition. In a still further aspect of the present invention, all of the single step forward upshifts and downshifts are single transition shifts; and all of the double step forward ratio interchanges, i.e., first to third, second to fourth and third to fifth, are single transition shifts.

BRIEF DESCRIPTION OF THE DRAWINGS

FIG. 3 is a chart of the ratios and step sizes attainable with various ring gear to sun gear tooth ratios in the two planetary gear sets utilized in the planetary gear arrangement.

DESCRIPTION OF AN EXEMPLARY EMBODIMENT

Figures 1, 2:
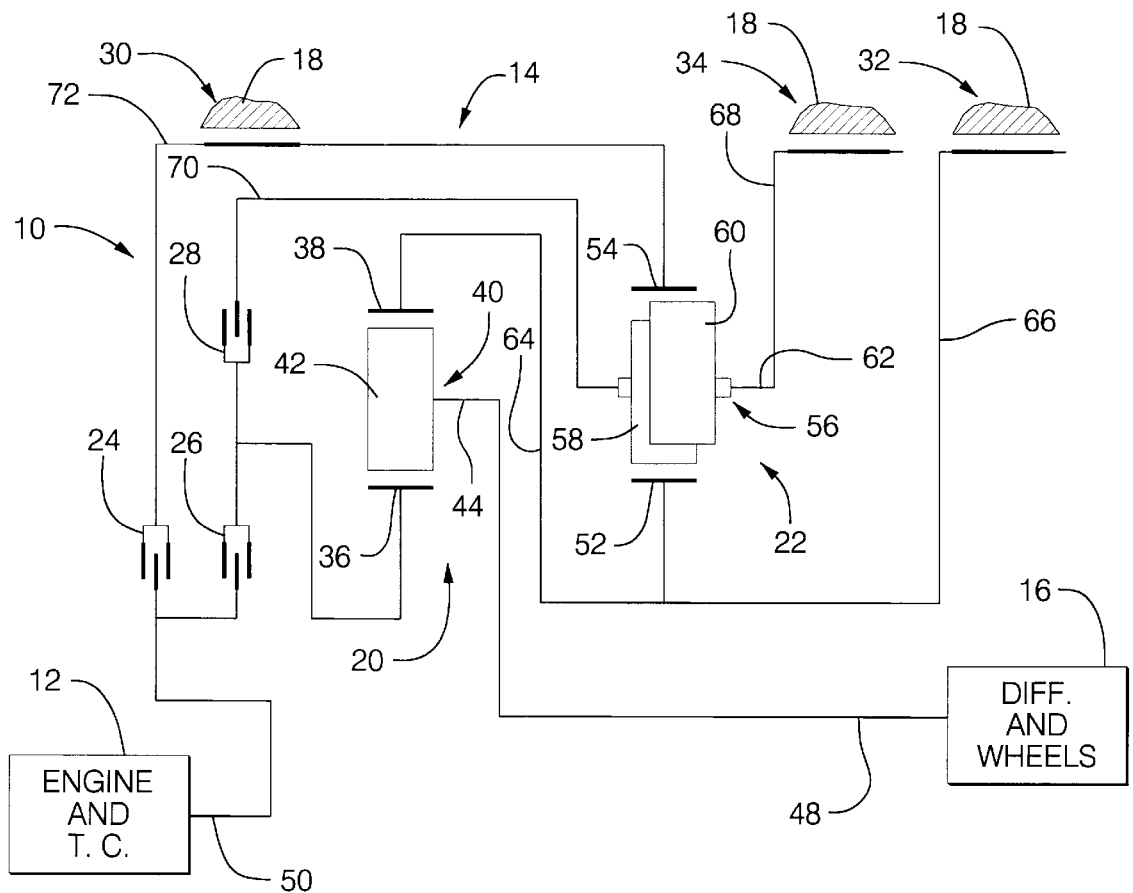
FIG. 1 is a schematic representation of a powertrain having a planetary gear arrangement incorporating one embodiment of the present invention.
FIG. 2 is a truth table describing the engagement schedule of the friction devices used with the planetary gear arrangement of FIG. 1.

A powertrain 10, including an engine and torque converter 12, a planetary gear arrangement or transmission 14, and a differential 16, is shown in FIG. 1. The engine and torque converter 12 are conventional devices which are used to provide input power to the planetary gear arrangement 14, and the differential 16 is a conventional gearing mechanism which delivers power from the transmission to the wheels of a vehicle, not shown. The differential 16 can be included in the same housing as the gearing arrangement 14 or in a separate housing. In most modern front wheel drive powertrains, the differential is packaged with the transmission, while in rear wheel drive powertrains the differential is housed separately, usually with the rear axles.

The planetary gear arrangement 14 has a housing 18 in which a simple planetary gear set 20 and compound planetary gear set 22 are contained. Also included in the transmission are a plurality of selectively engageable torque transmitting devices comprised of three clutches 24, 26 and 28 and three brakes 30, 32 and 34. The clutches 24, 26 and 28 are preferably of the fluid-operated friction disc type, and the brakes 30, 32 and 34 are fluid-operated friction disc type or friction band type. All of these devices are well known to those skilled in the design and use of power transmissions. It is not believed that a more extensive description of the design and operation thereof is required. The clutches 24 and 26 are input clutches and the clutch 28 is an interconnecting clutch.

The simple planetary gear set 20 includes a sun gear member 36, a ring gear member 38 and a planetary carrier assembly member 40. The planetary carrier assembly member 40 has a plurality of pinion gear members 42 rotatably mounted in a housing cage or spider 44. The pinion gear members 42 are disposed in meshing relation with the sun gear member 36 and the ring gear member 38. The planetary carrier assembly member 40 is continuously drivingly connected with an output shaft 48. The sun gear member 36 is selectively connectable with an input shaft 50 through the clutch 26. The input shaft 50 is drivingly connected with the engine and torque converter 12

The compound planetary gear set 22 has a sun gear member 52, a ring gear member 54 and a planetary carrier assembly member 56. The planetary carrier assembly member 56 includes a plurality of meshing pinion gear members 58 and 60 rotatably mounted in a housing cage or spider 62. The pinion gear members 58 are also in meshing relation with the sun gear member 52, and the pinion gear members 60 are in meshing relation with the ring gear member 54. The sun gear member 52 and the ring gear member 38 are continuously drivingly interconnected by a hub 64 and selectively connectable with the housing 18 through a hub 66 and the brake 32. The planetary carrier assembly member 56 is selectively connectable with the housing 18 via a hub 68 and the brake 34 and the planetary carrier assembly member 56 is also selectively connectable with the sun gear member 36 through a hub 70 and the clutch 28. The ring gear member 54 is selectively connectable with the input shaft 50 through a hub 72 and the clutch 24. The ring gear member 54 is also selectively connectable with the housing 18 through the hub 72 and the brake 30.

The torque transmitting devices, clutches 24, 26 and 28 and brakes 30, 32 and 34, are controlled by a conventional hydraulic or electro-hydraulic control system, not shown, to provide five forward drive ratios, a reverse drive ratio and a neutral condition. The truth table shown in FIG. 2 describes the sequence of operation for the torque transmitting devices. The chart shown in FIG. 3 describes the drive ratios and step sizes between ratios for various ring gear to sun gear tooth ratios in the planetary gear sets 20 and 22. Other combinations of tooth ratios are possible, and these are given as examples of the overall ratio spread of the powertrain. With the examples given, the overall ratio spread is within the range of 5.0 to 5.5, which is acceptable for most passenger vehicle powertrains.

During the reverse drive ratio, the neutral condition and the first forward drive ratio, the clutches 26 and 28 are engaged. To complete the reverse drive ratio, the brake 30 is engaged to control a smooth vehicle launch. The brake 30 establishes the ring gear member 54 as a reaction member in the planetary gear arrangement 14, and the clutches 26 and 28 establish the sun gear member 36 and planetary carrier assembly member 56 as input members. The sun gear member 52 and ring gear member 38 are driven a direction opposite to the sun gear member 36. The gear ratio provided to the planetary gear set 20 by the ring gear member 38 is greater than the gear ratio provided by the sun gear member 36 such that a reverse rotation occurs at the planetary carrier assembly member 40 and therefore output shaft 48. Thus, the reverse ratio is determined by both planetary gear set 20 and planetary gear set 22.

The first forward ratio is completed with the controlled engagement of the brake 32, which establishes the ring gear member 38 as a reaction member in the planetary gear arrangement. The sun gear member 36 remains the input member for the planetary gear arrangement. The first forward ratio is determined only by the planetary gear set 20.

The second forward drive ratio is established by disengaging the clutch 26 and simultaneously engaging the clutch 24. The ring gear member 54 becomes the input member, and the sun gear member 52 and ring gear member 38 remain the reaction members. The planetary carrier assembly member 56 is driven forwardly at an overdrive ratio as is the sun gear member 36. This results in a forward speed reduction ratio at the planetary carrier assembly member 40 and therefore the output shaft 48. The second forward drive ratio is dependent on both planetary gear set 20 and planetary gear set 22. This is a single transition upshift, that is, a one-for-one swap occurs between the torque transmitting devices.

The third forward drive ratio is established by the simultaneous disengagement of the brake 32 and engagement of the clutch 26. This results in a one-to-one ratio in the planetary gear arrangement 14. This is a single transition shift.

The fourth forward drive ratio is established with the simultaneous disengagement of the clutch 26 and engagement of the brake 34. This sets the planetary carrier assembly member 56 and sun gear member 36 as reaction members in the planetary gear arrangement. The ring gear member 54 is the input member such that the sun gear member 52 is driven forwardly at an overdrive ratio. The speed of the sun gear member 52 and ring gear member 38 is equal. The overdrive ratio established in the planetary gear set 22 is greater than the underdrive ratio at the planetary gear set 20, resulting in a forward overdrive ratio. This is a single transition shift.

The fifth forward ratio is established with the simultaneous interchange of the clutch 26 and the clutch 28. The planetary carrier assembly member 56 is the reaction member in the planetary gear arrangement 14, and the sun gear member 36 and the ring gear member 54 are both input members. The sun gear member 52 is driven forwardly at an overdrive ratio as in the fourth ratio; however, the sun gear member 36 is also driven forwardly by the input shaft 50. This results in an overdrive ratio at the planetary carrier assembly member 44 and therefore the output shaft 48. This overdrive ratio results in faster rotation of the output shaft 48 for a given input shaft rotational speed. This is a single transition shift.

At times it is desirable to provide skip shifts in the transmission which result in an interchange of more than one step. A third to first or third to fifth are examples of this type of interchange. The present invention permits single transition double step interchanges for all forward ratios. The first to third and vice versa is a single transition interchange. This occurs with the interchange of brake 32 and clutch 24. The third to fifth and vice versa is a single transition interchange which occurs with the swapping of clutch 28 and brake 34. The second to fourth and vice versa is a single transition interchange. This interchange occurs with the swapping of brake 32 and brake 34. The interchange from the first forward ratio to the reverse ratio and vice versa is also of the single transition variety. This interchange involves the swapping of brake 30 and brake 32.

The double step downshifts permit better engine braking control, and the double step upshifts can improve the fuel economy. These upshifts do, however, reduce the acceleration performance of the vehicle.

What is claimed is:

1. A multi-speed planetary transmission comprising:
   an input shaft;
   an output shaft;
   a simple planetary gear set having a first sun gear member, a first ring gear member and a first planetary carrier assembly member, said planetary carrier assembly member being continuously drivingly connected with said output shaft;
   a compound planetary gear set having a second sun gear member, a second ring gear member and a second planetary carrier assembly member, said second sun gear member being continuously drivingly connected with said first ring gear member; and
   a plurality of selectively engageable torque transmitting devices comprising a first clutch selectively connecting said second ring gear member with said input shaft, a second clutch selectively connecting said first sun gear member with said input shaft, a third clutch selectively interconnecting said first sun gear member with said second planetary carrier assembly member, a first brake selectively connecting said second ring gear member with a stationary housing member, a second brake selectively connecting said first ring gear member and said second sun gear member with said stationary housing member and a third brake selectively connecting said second planetary carrier assembly member with said stationary housing member, said torque transmitting devices being engaged in combinations to establish five forward drive ratios and a reverse drive ratio between said input shaft and said output shaft.

2. The multi-speed planetary transmission defined in claim 1 wherein the torque transmitting devices are engaged in combinations of three and wherein two of the torque transmitting devices are engaged in the reverse drive ratio, the first forward drive ratios and a neutral condition.

3. The multi-speed planetary transmission defined in claim 1 wherein the torque transmitting devices are swapped in single transition interchanges during all double step interchanges between said forward drive ratios.

4. The multi-speed planetary transmission defined in claim 1 wherein the torque transmitting devices are swapped in single transition interchanges during all single step and all double step interchanges between said forward drive ratios.

5. The multi-speed planetary transmission defined in claim 1 wherein a first and lowest of the forward drive ratios is established between the input shaft and the output shaft by the simple planetary gear set only, and wherein the reverse drive ratio and a second, third, fourth and fifth of the forward drive ratios are dependent on both said planetary gear sets to establish the ratios between said input shaft and said output shaft.

* * * * *